Sept. 30, 1969 R. P. BEHEIM 3,469,394

ROCKET PROPELLANT INJECTION

Original Filed Oct. 6, 1965

INVENTOR
RUDOLF P. BEHEIM

BY Glenn McCoy
Gene E. Shook

ATTORNEYS

United States Patent Office 3,469,394
Patented Sept. 30, 1969

3,469,394

ROCKET PROPELLANT INJECTION

Rudolf P. Beheim, 18514 Springdale Ave., Cleveland, Ohio 44135

Continuation of application Ser. No. 493,590, Oct. 6, 1965. This application Nov. 24, 1967, Ser. No. 685,472
Int. Cl. F02g *3/00;* F02k *9/02*
U.S. Cl. 60—39.06 5 Claims

ABSTRACT OF THE DISCLOSURE

Rocket propellant injection by introducing a central stream of liquid propellant axially into an atomization chamber and a second stream of propellant tangentially into the same chamber. The propellant is finely atomized without producing a reaction so that the mixture is unburned as it enters the rocket combustion chamber from the atomization chamber.

Related application

This application is a continuation of copending application Ser. No. 493,590, which was filed on Oct. 6, 1965, now abandoned.

Origin of the invention

The invention described herein was made by an employee of the United States Government and may be manufactured and used by or for the Government for governmental purposes without the payment of any royalties thereon or therefor.

Background of the invention

This invention relates to achieving fine atomization of liquid rocket propellants for injection into the combustion chamber of a rocket engine. More particularly, the invention is concerned with fine atomization and premixing by directing streams of propellant tangentially about a central stream of liquid propellant to produce a cone of finely atomized propellant without reaction prior to introduction into the rocket combustion chamber.

Various ways have been proposed to atomize rocket propellants. For example, impinging jets of propellants have been used, and injectors having V configurations have been proposed. Also, tube injectors with spiral inserts for atomization have been suggested.

A number of problems have arisen with the use of such prior art devices. Among these are poor atomization of the propellant and difficulty in fabricating the hardware. Also, explosions were experienced with certain conventional injectors because of reactions taking place inside pre-mix chambers. Of particular concern was the fact that prior art propellant feed systems were designed so that the liquid propellants were forced to travel through reacted gases before striking each other. In such systems these gases produced atomization and reaction prior to mixing.

Summary of the invention

These problems have been solved by the present invention which utilizes a rocket propellant injector having an atomization chamber located immediately adjacent the rocket combustion chamber. A liquid propellant is injected into this atomization chamber along its axis towards the combustion chamber to form a central propellant stream. Propellant is likewise injected tangentially into the atomization chamber about this central stream. Because of the high velocity together with the circular motion of the tangential stream, good atomization is achieved without reaction, and a cone of finely atomized propellant is formed in the combustion chamber at the exit end of the atomization chamber.

Objects of the invention

It is, therefore, an object of the present invention to provide an improved method and apparatus for injecting liquid rocket propellants without relying on internal parts in the injector for atomization.

Another object of the invention is to provide an improved method and apparatus for injecting liquid rocket propellants which can be used for the atomization of single, double, or multiple propellants without explosions or burnouts while obtaining good atomization.

A further object of the invention is to provide a liquid propellant feed system in which one propellant stream strikes another tangentially at a high velocity in an atomization chamber so that no reacted gases are present to produce atomization and reaction prior to mixing.

A still further object of the invention is to provide a propellant feed system in which liquid propellants are mixed as they are atomized and before they react or are influenced by reacted gases.

These and other objects and advantages of the invention will be apparent from the specification which follows and from the drawings wherein like numerals are used throughout to identify like parts.

Description of a preferred embodiment

Figure 1:
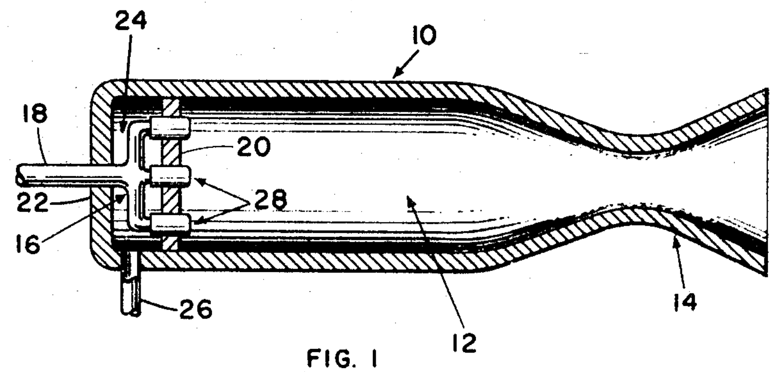
FIG. 1 is a section view of a liquid fueled rocket having a propellant feed system utilizing injectors constructed in accordance with the present invention.

Referring now to the drawings, there is shown in FIG. 1 a rocket 10 which utilizes the present invention. The rocket 10 has a combustion chamber 12 in which a propellant is burned, and a convergent-divergent nozzle 14 is positioned at one end of the combustion chamber 12.

A propellant supply manifold 16 is provided at the end of the combustion chamber 12 opposite the nozzle 14. A liquid propellant flows to the manifold 16 through a supply line 18 from a suitable source, such as a pressurized tank. Any conventional ignitor can be mounted in the combustion chamber 12.

A face plate 20 forms the end of the combustion chamber 12 adjacent the manifold 16. The space between the face plate 20 and the head end 22 of the rocket 10 forms a supply chamber 24. The propellant supply manifold 16 is contained within the supply chamber 24. A pipe 26 connected to a suitable pressurized source supplies fluid propellant to the chamber 24.

Figure 2:
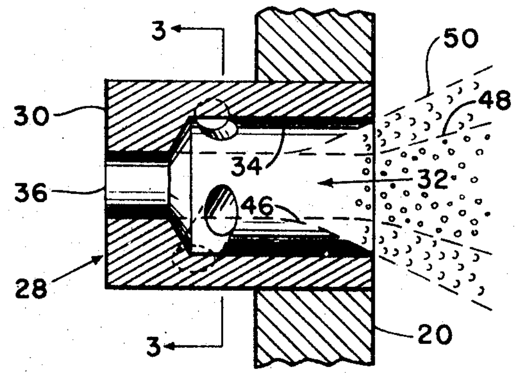
FIG. 2 is an enlarged axial section of an injector embodying the features of the invention.

Injectors 28 constructed in accordance with the present invention are carried by the face plate 20 as shown in FIGS. 1 and 2. Each injector 28 has a cylindrical body 30 shown in FIGS. 2 and 3 that extends through the face plate 20.

An atomization chamber 32 having a generally cylindrical surface 34 is formed in the central portion of the body 30, and the open end of the chamber 32 faces the combustion chamber 12. A centrally disposed bore 36 in the closed end of injector 28 extends through the base of the body 30 from the end of the atmoization chamber 32 opposite the combustion chamber 12 to the propellant supply manifold 16.

Figure 3:
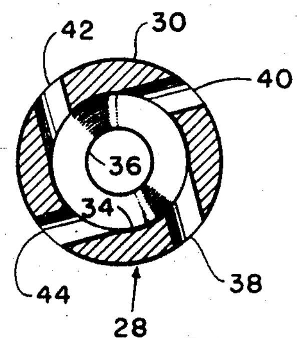
FIG. 3 is a sectional view taken along the line 3—3 in FIG. 2.

Additional passages 38, 40, 42 and 44 shown in FIG. 3 extend outward through the side wall of the body 30 from the atomization chamber 32 to the propellant supply chamber 24. Each of these passages is not only tangential to the surface 34 but also angularly disposed to a plane normal to the axis of the chamber 32.

The diameter of each of these passages 38, 40, 42 and 44 is equal to one-half the difference between the diameter of the chamber 32 and the diameter of the bore 36. Thus, each tangential passage has a diameter equal to the distance between the bore 36 and the cylindrical surface 34, and a fluid stream emitted from any of these passages will strike both the surface 34 and the liquid stream emitted from the bore 36.

In operation, a liquid propellant under pressure flows to the supply manifold 16 through the line 18. This propellant enters the atomization chamber 32 through the bore 36 which directs the propellant towards the combustion chamber 12 in the form of a central propellant stream 46.

Another propellant, which may be either a liquid or a gas, enters the atomization chamber 32 at a high velocity through the passages 38, 40, 42 and 44 in the form of streams that are tangential to both the central stream 46 and the surface 34. These tangential streams of fluid propellant enter the chamber 32 at high velocities and strike both the surface 34 and the liquid stream 46. There are not reacted gases present in the chamber 32 because the propellant streams touch each other as they leave their respective passages.

An important feature of the invention is that the propellant is atomized without producing a reaction in the atomization chamber 32, and the resulting atomized mixture discharges from this atomization center chamber as finally atomized unburned particles. This results from both the high velocity at which the propellants pass through their respective passages in the atomization chamber 32 as well as the circular motion of the tangent propellant streams about the central axial propellant streams. Because the tangential passages 38, 40, 42 and 44 are in close proximity to the head end of the atomization chamber 32, hot gas pockets are eliminated. Also, because of the relationships of the diameters of the passages as well as the angle of the tangential passage, all material in the atomization chamber 32 is constantly pushed towards the combustion chamber.

As shown in FIG. 2 the central propellant stream 46 emerges from the atomization chamber 32 into the combustion chamber 12 in the form of a truncated cone 48 of very finely atomized particles. This cone 48 is surrounded by an outer cone 50 of propellant from the tangential streams.

Description of an alternate embodiment

Figure 4:
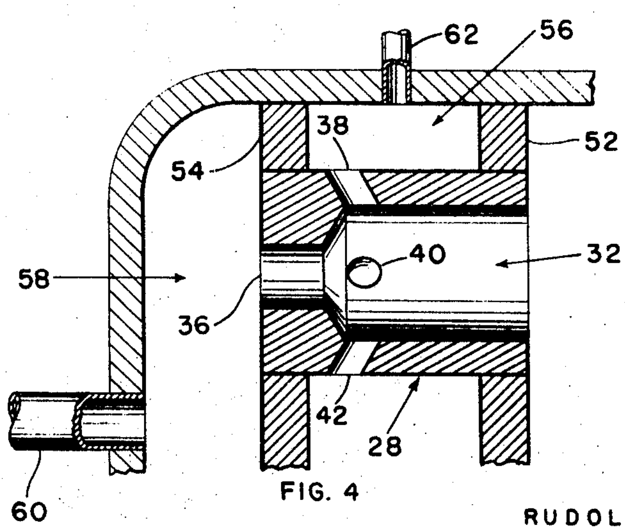
FIG. 4 is a sectional view similar to FIG. 2 illustrating an alternate embodiment of the invention.

An alternate embodiment of the invention is shown in FIG. 4 wherein a pair of face plates 52 and 54 are used instead of the single face plate 20 and the propellant manifold 16 shown in FIG. 1. A chamber 56 is formed between the plates 52 and 54. The plate 52 forms the rear wall of the combustion chamber of the rocket while the plate 54 forms the forward wall of another chamber 58. Injectors 28 are carried by the plates 52 and 54, and each extends from the rocket combustion chamber through the chamber 56 to the other chamber 58.

A propellant, either the fuel or the oxidizer, flows under pressure to the chamber 58 through a line 60. This propellant then passes through the bore 36 into the atomization chamber 32 and forms a central propellant stream.

Another pressurized propellant, which is likewise either a fuel or an oxidizer in the form of a liquid or gas, flows through a line 62 from another pressurized source into the chamber 56. This propellant is injected tangentially into the atomization chamber 32 about the central stream. Again, a resulting cone of atomized propellants is formed in the combustion chamber of the rocket at the exit end of the atomization chamber.

What is claimed is:

1. In combination with a rocket engine of the type having a combustion chamber, an injector comprising:
- a body mounted at one end of the rocket combustion chamber having a cylindrical chamber therein with an open end thereof in communication with said rocket combustion chamber and an opposite closed end,
- a passage extending through said body at the closed end of said cylindrical chamber, said passage being coaxial with said cylindrical chamber,
- means for connecting said passage to a pressurized supply of liquid propellant to form a stream of liquid propellant along the axis of said cylindrical chamber extending from said closed end to said open end,
- at least one other passage extending through the side fo said body, said other passage being tangential to the surface of said cylindrical chamber, and
- means for connecting said other passage to a pressurized supply of fluid propellant to direct a fluid propellant stream through the side of said body into said cylindrical chamber, said stream of fluid propellant being tangential to both said axial stream of liquid propellant and the cylindrical wall of said chamber to mix the same while forming a cone of atomized liquid propellant in the rocket combustion chamber at said open end of said cylindrical chamber.

2. Apparatus as claimed in claim 1 including a plurality of said tangential passages wherein each of the tangential passages has a diameter substantially equal the distance between the passage in the end of the body and the side wall of the cylindrical chamber so that each of said fluid streams is tangential to the axial stream of liquid propellant.

3. A method of injecting propellant into a rocket combustion chamber comprising the steps of, directing a liquid propellant stream towards the rocket combustion chamber at one end thereof, and
- directing a fluid propellant stream along a helical path about said liquid propellant stream at a high velocity prior to the entry thereof into said rocket combustion chamber, said fluid propellant stream being in tangential contact with said liquid propellant stream to simultaneously mix and atomize both propellants prior to reaction in said rocket combustion chamber.

4. A method of injecting propellant as claimed in claim 3 wherein said liquid propellant stream is a liquid fuel and the tangential propellant stream is a fluid oxidant.

5. A method of injecting propellant as claimed in claim 3 wherein said liquid propellant stream is liquid oxidant and the tangential propellant stream is fluid fuel.

References Cited

UNITED STATES PATENTS

| | | |
|---|---|---|
| 1,451,063 | 4/1923 | Anthony. |
| 2,936,577 | 5/1960 | Amneus. |
| 3,169,368 | 2/1965 | Munding. |

CARLTON R. CROYLE, Primary Examiner

D. HART, Assistant Examiner

U.S. Cl. X.R.

60—39.74, 217, 258; 239—405